(12) United States Patent
Guillemin et al.

(10) Patent No.: US 10,038,320 B2
(45) Date of Patent: Jul. 31, 2018

(54) PHASE SELECTION FOR POLYPHASE ELECTRICAL INSTALLATION

(71) Applicant: Commissariat à l'Énergie Atomique et aux Énergies Alternatives, Paris (FR)

(72) Inventors: Sylvain Guillemin, Allevard les Baines (FR); Rémi Vial, Chambery (FR)

(73) Assignee: Commissariat à l'Énergie Atomique et aux Énergies Alternatives, Paris (FR)

( * ) Notice: Subject to any disclaimer, the term of this patent is extended or adjusted under 35 U.S.C. 154(b) by 254 days.

(21) Appl. No.: 14/894,130

(22) PCT Filed: May 28, 2014

(86) PCT No.: PCT/FR2014/051274
§ 371 (c)(1),
(2) Date: Nov. 25, 2015

(87) PCT Pub. No.: WO2014/191692
PCT Pub. Date: Dec. 4, 2014

(65) Prior Publication Data
US 2016/0105024 A1   Apr. 14, 2016

(30) Foreign Application Priority Data

May 28, 2013   (FR) .................................... 1354796

(51) Int. Cl.
*H02J 3/26*   (2006.01)
(52) U.S. Cl.
CPC ................. *H02J 3/26* (2013.01); *Y02E 40/50* (2013.01)

(58) Field of Classification Search
None
See application file for complete search history.

(56) References Cited

U.S. PATENT DOCUMENTS

| | | | | |
|---|---|---|---|---|
| 5,281,859 A | * | 1/1994 | Crane | .................. H01H 47/226 307/125 |
| 6,215,290 B1 | * | 4/2001 | Yang | .................. H02M 3/1584 323/282 |

(Continued)

FOREIGN PATENT DOCUMENTS

| | | |
|---|---|---|
| DE | 102011078047 A1 | 12/2012 |
| EP | 0556754 A2 | 8/1993 |

OTHER PUBLICATIONS

International Preliminary Report on Patentability, dated Nov. 28, 2015, from corresponding International Patent Application No. PCT/FR2014/051274.

(Continued)

*Primary Examiner* — Jared Fureman
*Assistant Examiner* — Joel Barnett
(74) *Attorney, Agent, or Firm* — Wolf, Greenfield & Sacks, P.C.

(57) ABSTRACT

A method for balancing a polyphase network for supplying an installation including a plurality of sockets for plugging-in electrical equipment, wherein a phase selector is inserted for each socket, between a system for supplying a polyphase voltage and the socket, and intercepts a command signal for energizing the socket. Once an energizing command has been received from one of the monophase equipments, the least charged phase is selected for powering the equipment, the evaluation of the least charged phase being carried out upstream of the system.

9 Claims, 4 Drawing Sheets

(56) References Cited

U.S. PATENT DOCUMENTS

| | | | | |
|---|---|---|---|---|
| 6,628,009 B1* | 9/2003 | Chapel | ...................... | H02J 3/26 |
| | | | | 307/14 |
| 2006/0049819 A1* | 3/2006 | Bruno | .................. | G01R 21/133 |
| | | | | 324/142 |

OTHER PUBLICATIONS

International Search Report, dated Aug. 19, 2014, from corresponding International Application No. PCT/FR2014/051274.

* cited by examiner

PHASE SELECTION FOR POLYPHASE ELECTRICAL INSTALLATION

CROSS-REFERENCE TO THE RELATED APPLICATIONS

This application is a national stage filing under 35 U.S.C. § 371 of International PCT Application PCT/FR2014/051274, filed May 28, 2014, which claims the priority benefit of French patent application FR13/54796, filed May 28, 2013, each of which applications is incorporated herein by reference to the maximum extent allowable by law.

BACKGROUND

The present disclosure generally relates to electric installations and, more specifically, to installations receiving a three-phase power supply. An example of application of the present invention relates to electric vehicle charging installations.

Discussion Of The Related Art

Document WO2012/110472 of the applicant discloses a load balancing device on a polyphase network which, to have a load switch from one phase to another, uses a single-phase voltage generated by an inverter. This voltage is first synchronized with the first phase, and then progressively phase-shifted until it is synchronized with the other phase.

Phase-selection systems which aim at avoiding a loss of power supply of a single-phase load are also known. To achieve this, the selectors monitor the voltage value of the different phases and, if the voltage of the phase used by the single-phase load becomes lower than a threshold, switch to another phase of the polyphase network. Such a phase selector however generally results in increasing the imbalance between phases.

In installations for charging electric vehicle batteries, a plurality of charging stations are generally powered from a polyphase network (typically, a three-phase network). Electric vehicle chargers are generally single-phase, which poses problems of balancing of the loads connected to the different phases.

Document EP 0556754 describes an electric distribution system equipped with a phase selector using a circuit for measuring the loading of the phases.

Documents DE 10 2011 078047 and US 2013 062970 describe a phase selector measuring the loading of the different phases.

SUMMARY

It would be desirable to have a phase selection system in a polyphase network which is compatible with a phase balancing, that is, a balanced load distribution on the different phases of the polyphase network.

It would further be desirable to have such a selector which is compatible with electric vehicle charging installations.

An object of an embodiment is to provide a phase selector which overcomes all or part of the disadvantages of usual phase selectors.

Another object of an embodiment is to provide a solution compatible with single-phase and three-phase equipment.

To achieve all or part of these and other objects, a method of balancing a polyphase network for powering an installation comprising a plurality of sockets of connection of electric equipment is provided, wherein:

for each socket, a phase selector is interposed, between a polyphase voltage supply system and said socket, and intercepts a socket energizing control signal; and once a single-phase equipment energizing control signal has been received, the least loaded phase is selected to power this equipment, the evaluation of the least loaded phase being performed upstream of the system.

According to an embodiment, each phase selector intercepts a control signal for energizing of the socket to which it is associated.

According to an embodiment, the energizing control signal is transmitted to the socket subsequently to the phase selection.

According to an embodiment, a control signal for selecting the least loaded phase is sent by said system to said selectors.

According to an embodiment, the evaluation of the least loaded phase is performed by measuring the current sampled from the different phases upstream of the selector.

An embodiment also provides a phase selector capable of implementing the phase selection method.

According to an embodiment, the selector comprises:
first terminals intended to receive a polyphase power supply;
second terminals intended to be connected to an electric equipment power supply socket;
a set of switches for connecting said first terminals to said second terminals; and
a circuit for controlling said switches.

According to an embodiment, said control circuit interrupts a control connection between the system and a contactor, itself connected to the socket.

An embodiment also provides a polyphase power supply installation, comprising:
a system for supplying a polyphase voltage;
a plurality of equipment powering sockets; and
between said system and each socket, a phase selector.

According to an embodiment, an energizing contactor is interposed between each selector and the socket to which it is associated.

BRIEF DESCRIPTION OF THE DRAWINGS

The foregoing and other features and advantages of the present invention will be discussed in detail in the following non-limiting description of specific embodiments in connection with the accompanying drawings, among which.

DETAILED DESCRIPTION

The same elements have been designated with the same reference numerals in the different drawings. For clarity, only those elements which are useful to the understanding of the embodiments which will be described have been shown and will be detailed. In particular, the elements for supplying the polyphase power supply have not been detailed, the described embodiments being compatible with usual elements. Further, in the application to an electric vehicle charging system comprising multiple stations, the management of the different stations to optimize the sizing and respect the contractual and technical constraints of use of the electric power system which powers the charging installation has not been detailed either, the described embodiments being here again compatible with usual management processes.

Figure 1:
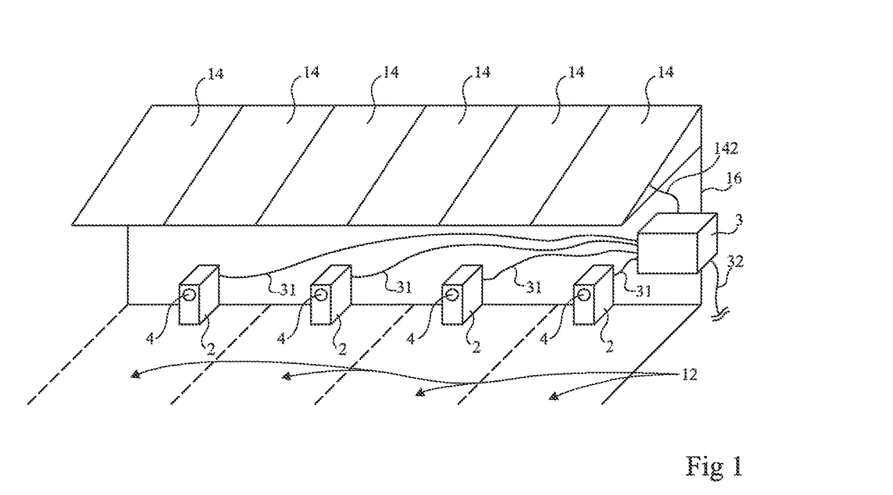
FIG. 1 very schematically illustrates an example of electric motor vehicle charging installation of the type to which the embodiments which will be described more specifically apply.

FIG. 1 schematically shows an example of an electric vehicle charging installation. Such an installation equips parking spaces 12 where electric vehicles to be charged are intended to park. Each parking space 12 is equipped with a charging station 2 provided with a socket 4, most often standardized, intended to receive a plug of an electric vehicle charging cable (not shown in FIG. 1).

The electric power is distributed to the different stations 2 from system 3, through connections 31. System 3 is connected (connection 32) to the polyphase electric distribution system (typically three-phase) to sample electric power from the system. System 3 may receive electric power originating from other sources than the polyphase distribution system. It may for example be a photovoltaic installation (for example, photovoltaic panels 14 equipping the roof of a shelter 16 covering spaces 12), or a wind-powered or hydroelectric installation.

In practice, when an electric vehicle desires to charge its batteries, the user plugs the plug of the vehicle charging cable into a socket 4 of a station 2. The sockets and plugs generally comprise not only power supply conductors, but also connections of communication between the vehicle and system 3 (as a variation, the communication connections may be radio connections). The communication connections are used to verify the proper connection of the electric vehicle to the station and may be used to modulate the vehicle charge power.

Sockets 4 are most often three-phase sockets (in particular, the power generation from the photovoltaic panels is performed with a three-phase inverter and the photovoltaic installation is most often connected to the three-phase distribution system). However, most electric vehicles have single-phase chargers, so that the plugs which connect them to sockets 4 comprise a single-phase conductor, in addition to a neutral conductor, to a ground conductor, and to one or a plurality of control wires. In the case of a vehicle embarking a single-phase charger, only the conductor connected to terminal B1 (see FIG. 2) of the socket will be used.

The phase balancing in the installation is usually statically performed, by connecting terminals B1 of sockets 4 of charging stations 2 sometimes to phase conductor L1, sometimes to phase conductor L2, and sometimes to phase conductor L3, originating from system 3.

Figure 2:
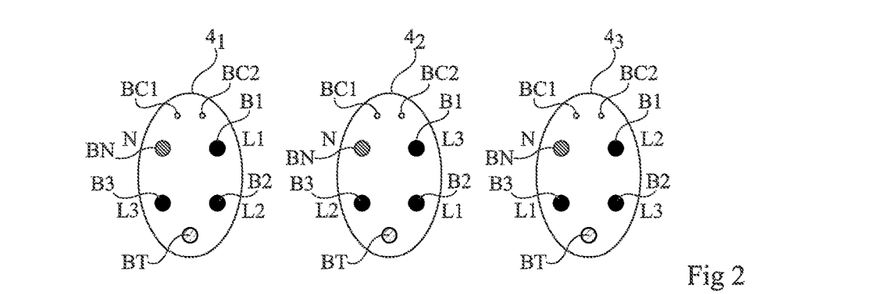
FIG. 2 shows an example of three-phase sockets in three phase configurations.

FIG. 2 is a simplified representation of an example of standardized sockets 4. The example taken herein is a socket of type "EV plug alliance type 3" which is both single-phase and three-phase. Three sockets 41, 42, and 43 have been shown in FIG. 2. Each socket 4$i$ (with i ranging from 1 to 3 in FIG. 2) comprises three terminals B1, B2, and B3, a neutral terminal BN, a ground terminal BT, and one or a plurality (two in the shown example) of communication terminals BC1 and BC2.

Arbitrarily and as an example, the case where the three phases noted L1, L2, and L3 of the network (originating from system 3) are respectively connected to terminals B1, B2, and B3 for socket 41, to terminals B2, B3, and B1 for terminal 42, and to terminals B3, B1, and B2 for socket 43. This is generally what is provided in the case of a static balancing. Thus, if three vehicles are respectively plugged by single-phase plugs having their phase pin opposite terminal B1 and sample the same power at the same time, the phases are balanced.

This ideal case however does not occur in practice and a charge imbalance between phases can be observed.

Further, as soon as the number of phases is not a multiple of three (for example, four sockets in the example of FIG. 1), it is no longer possible to balance the phases, even statically.

Figure 3:
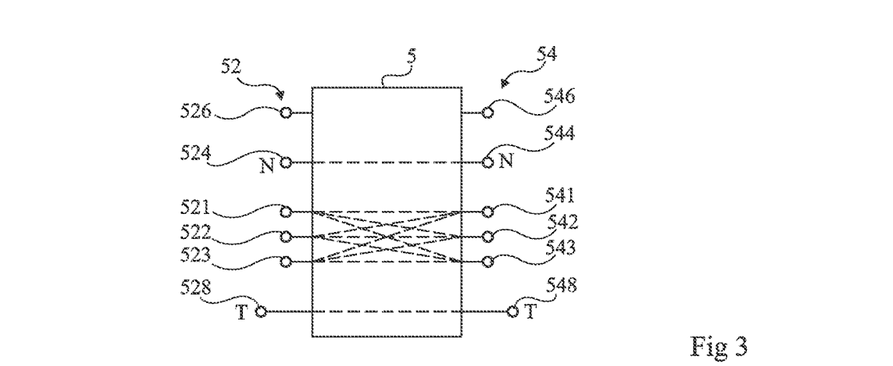
FIG. 3 is a very simplified representation of an embodiment of a phase selector.

FIG. 3 is a simplified representation of an embodiment of a phase selector 5, intended to be interposed between system 3 and each socket 4$i$ for phase balancing purposes.

Selector 5 comprises an input terminal block 52, provided with three terminals 521, 522, and 523 intended to be connected to the different phases of a polyphase network (for example, three-phase). For example, these terminals are connected to system 3 of FIG. 1. Terminal block 52 also comprises a terminal 524 intended to be connected to the neutral of the three-phase power supply as well as to at least one terminal 526 intended to convey control signals.

Selector 5 also comprises an output terminal block 54 provided, in this example, with three terminals 541, 542, and 543 intended to supply a socket 4 with the phases of a polyphase power supply, a neutral terminal 544, and at least one control signal transmission terminal 546.

On the output side, terminal block 54 is intended to be connected, directly or via a contactor (not shown in FIG. 3) to a socket 4 of a station 2. The function of the contactor is, under control of a signal present on terminal 546, to connect the set of terminals 541 to 544 to socket 4. As will be seen hereafter, the function of the contactor may be fulfilled by the actual selector 5.

In practice, the portions upstream and downstream of selector 5 are connected to ground T, either independently from selector 5 or, as in the shown example, through respective terminals 528 and 548 of input and output terminal blocks.

Figure 4:
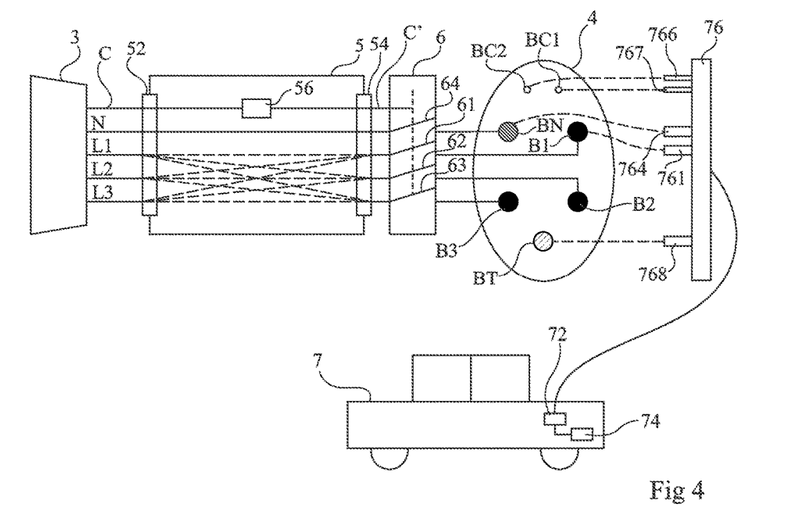
FIG. 4 very schematically shows a phase selector of the type in FIG. 3 in its environment.

FIG. 4 shows an example of a selector 5 in its environment. In this example, terminal block 52 of selector 5 is directly connected to system 3 (FIG. 1). As a variation, control signals C may be conveyed to another circuit. Output terminal block 54 is connected to an intermediate contactor 6 between selector 5 and the socket 4 for which the selector is intended. The case of a vehicle 7 having a single-phase charger 72 for its battery 74 is assumed. Charger 72 is then connected, via a plug 76, to socket 4. Plug 76 comprises two pins 766 and 767 intended to connect terminals BC1 and BC2 of socket 4, two pins 761 and 764 intended to respectively connect terminals B1 and BN of socket 4 and a ground pin 768 intended to connect terminal BT of socket 4. In the example of a single-phase charger, terminals B2 and B3 of socket 4 are not connected to charger 72. In the case of a two- or three-phase charger, one or two additional pins equip plug 76 to connect terminals B2 and B3 of socket 4 in order to connect them to the electric vehicle charger.

Contactor 6 acts, under control of a signal C' at the output of terminal block 54, to control switches 61 to 64 respectively connecting terminals 541 to 544 of output terminal block 54 to terminals B1, B2, B3, and BN of socket 4.

In the embodiments which will be described, the function of selector 5 is to branch the three phases from the input terminal block to the output terminal block by selecting the least loaded phase for block 541, and thus terminal B1 of socket 4.

Figure 5:
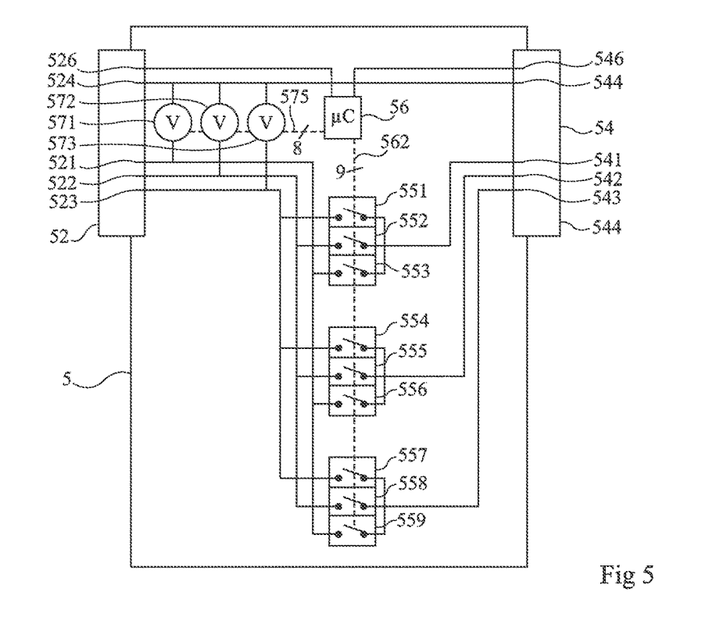
FIG. 5 is a more detailed block diagram of the phase selector of FIGS. 3 and 4.

FIG. 5 is a more detailed simplified representation of an embodiment of selector 5. In this embodiment, the identification of the least loaded phase is performed by comparison of the effective voltages of each phase. Other methods of identifying the least loaded phase are discussed hereafter. Nine switches 551 to 559 have first (input) terminals connected to terminals 521 to 523 and second (output) terminals connected to terminals 541 to 543 in order to, in operation, branch the three phases present on terminals 521 to 523 towards terminals 541 to 543. For example, the input terminals of switches 551, 554, and 557 are connected to terminal 521, the input terminals of switches 552, 555, and 558 are connected to terminal 522, and the input terminals of switches 553, 556, and 559 are connected to terminal 523. On the side of terminal block 54, the output terminals of switches 551 to 553 are connected to terminal 541, the output terminals of switches 554 to 556 are connected to terminal 542, and the output terminals of switches 557 to 559 are connected to terminal 543. Switches 551 to 559 are individually controllable and each receive a signal (signals 562) originating from a circuit 56, preferably included in selector 5. In the shown example, circuit 56 receives information relative to the voltages present on each of the phases at the selector input. This function has been symbolized in FIG. 5 by the presence of voltmeters 571, 572, and 573 (V) preferably included in selector 5, or other voltage measurement circuit, upstream of switches 551 to 559, providing measurement results (signals 575) to circuit 56. Further, circuit 56 has terminals connected to terminals 526 and 546 to intercept the communications between system 3 and the socket or its contactor, and process the control signals.

Signal 526 is sent by system 3 to station 2 to trigger the provision of electric power to the vehicle.

It is provided to select the least loaded phase to charge the vehicle battery. To achieve this, in the example of FIG. 5, the phase having the highest voltage, which thus corresponds to the phase from which the loads connected to system 3 (even upstream) draw the less power, is selected. Thus, the phase selection takes part in the phase balancing.

Advantage is taken from the fact that, when a vehicle is to be charged by the installation, losing a few seconds is of no importance. In other words, a slight delay between the plugging of plug 76 into socket 4, or its connection control, and the provision of the power supply voltage may be accepted. This delay corresponds to the time required to measure the phases and to select the least loaded phase. More generally, this amounts to intercepting the socket energizing control signal for the time necessary to select the order of the phases presented to the electric equipment connection socket.

Figure 6A:
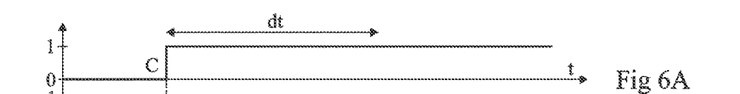
FIGS. 6A and 6B are timing diagrams illustrating the operation of the phase selector of FIG. 4.
Figure 6B:
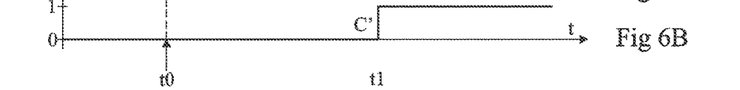

FIGS. 6A and 6B are timing diagrams illustrating the operation of selector 5. FIG. 6A is a state timing diagram of control signal C provided by system 3 to trigger the provision of a power supply to terminal 4 via contactor 6. FIG. 6B is a sate timing diagram of signal C' at the output of selector 5 for controlling contactor 6. In a simple version, signal C, supplied by system 3 to contactor 6, is a voltage step (digital signal in all or nothing) to control the turning on of switches 61 to 64. According to this example, the occurrence (time t0) of a rising edge on signal C, corresponding to an instruction for providing the power supply to terminal 4, triggers the measurement of the voltage levels of phases L1 to L3. As a variation, the voltage measurement is performed periodically and the last measurement is taken into account at time t0. When the measurement is performed (or taken into account) and selector 5 has appropriately switched switches 551 to 559, circuit 56 switches (time t1) signal C' to the high state to control contactor 6. In other words, circuit 56 intercepts the control order originating from system 3 and only transmits it to contactor 6 once the phase to which terminal 541 is connected has been selected. The voltage level measurement may be performed sequentially or in parallel. Similarly, the comparison performed by circuit 56 may be analog or digital. In practice, a microcontroller-type processing unit (µC) will be preferably used.

The presence of selector 5 and the performed phase selection does not adversely affect the connection of a three-phase plug to socket 4. Indeed, in the case of a three-phase automobile vehicle charger, socket 4 being powered by the three phases, the operation is maintained. It will just be ascertained to control switches 551 to 559 in adapted fashion to respect the rotation of the phases according to that powering terminal B1, that is, the phase rotation illustrated in relation with FIG. 2.

According to an embodiment, selector 5 is interposed between system 3 and the different contactors 6 associated with sockets 4. In this embodiment, no modification of the rest of the installation is necessary, the phase selection being integrally managed by selector 5. The intervention of selector 5 is transparent for system 3 and for contactor 6.

According to an embodiment, advantage is taken from the fact that switches 551 to 559 of selector 5 may play the role of switches 61 to 63 of connector 6. In selector 5, an additional switch (not shown) is provided to interrupt the neutral connection and make it controllable from circuit 56. This enables to suppress contactor 6, which is then no longer necessary.

Figure 7:
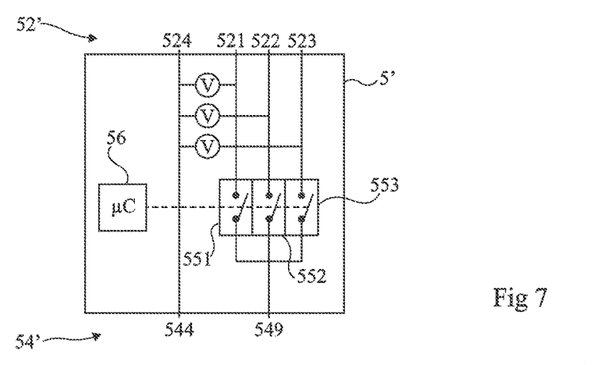
FIG. 7 schematically shows in the form of blocks an alternative phase selector adapted to a single-phase socket.

FIG. 7 illustrates an alternative embodiment of a phase selector 5' adapted to single-phase charging stations. For simplification, the control and ground terminals have not been illustrated in FIG. 7. Input terminal block 52' is identical to input terminal block 52 of selector 5 of the previous drawings. However, on the side of output terminal block 54', a single phase terminal 549 is provided and is intended to be connected to a single-phase socket (not shown). The forming of selector 5' is simplified in that only three switches 551 to 553 are necessary.

Figure 8:
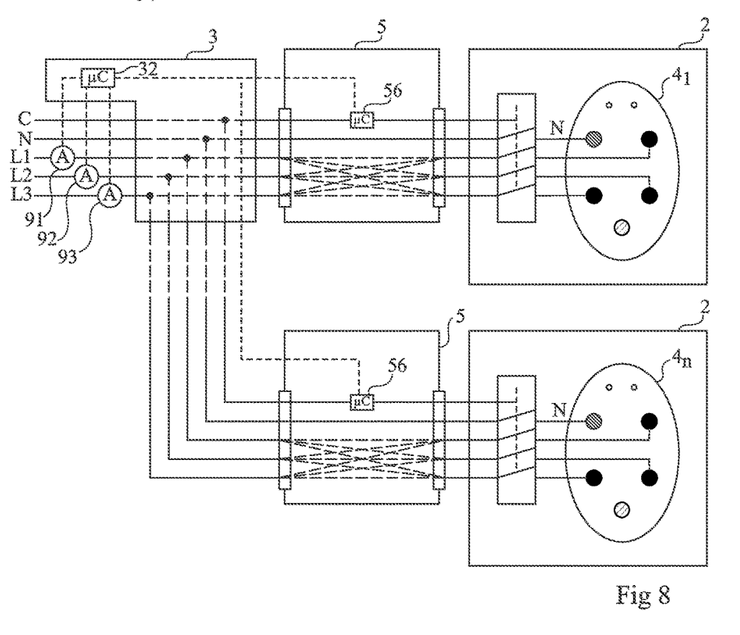
FIG. 8 illustrates an embodiment of a phase balancing system using phase selectors.

FIG. 8 schematically shows an installation according to a preferred embodiment where the general current consumption at the installation level is taken into account. According to this embodiment, instead of measuring the voltages of the phases at the level of selector 5, information representative of the current drawn from each of the phases by system 3, that is, by the entire installation, is measured. This operation is illustrated by ammeters 91, 92, and 93 (A) having their measurements sent to an electronic processing circuit 32 (for example, a microcontroller µC) of system 3. System 3 sends signals relative to the identification of the least loaded phase to respective microcontrollers 56 of the different selectors 5. In this embodiment, when a selector intercepts a control signal originating from the socket to which it is associated, it transmits the corresponding information to circuit 32 of system 3 to trigger the measurement enabling to estimate the least loaded phase upstream of the installation. As a variation, circuit 32 permanently estimates (periodically) the least loaded phase and transmits the information to the selectors. In this case, each selector has the information when it receives a control signal for from socket and can then provide thereto the phases in the appropriate order.

An advantage of this embodiment is that it enables to balance the power consumptions downstream of system 3 without taking into account a possible imbalance upstream of system 3.

Figure 9:
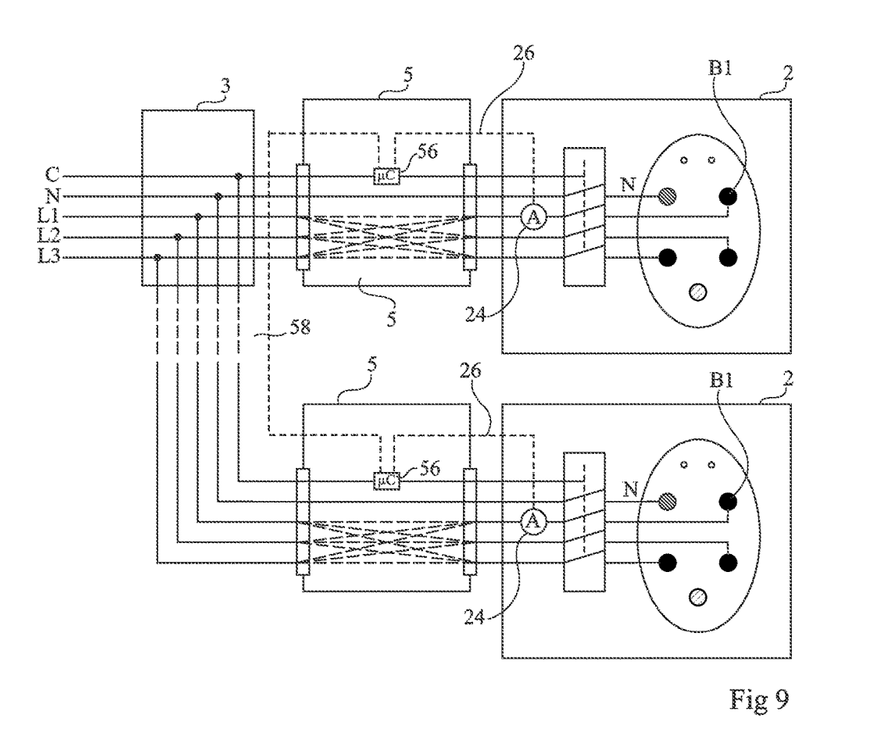
FIG. 9 illustrates a variation of FIG. 8.

FIG. 9 schematically shows an alternative embodiment according to which the measurement performed by selectors 5 to determine the phase to be connected to stations 2 is a current measurement (ammeter 24) performed at the level of sockets 4 on the power supply conductor of terminal B1 of the concerned sockets. This enables to improve the phase balancing by taking into account the respective power consumptions of the different terminals. To achieve this, circuits 56 of the different selectors should communicate together (connection 58). Assuming that each terminal transmits, over a communication but 26 (different from or confounded with the bus conveying signal(s) C'), the result of the current measurement performed by its ammeter, it is possible to determine the least loaded phase by comparing the different measurements. Such an embodiment does not require an intervention at the level of system 3 but however requires having current measurements at the level of terminals 4. Actually, this embodiment may take advantage of the existence of such current measurement devices present at the level of terminals 4 if the information relative to the performed measurement may be sampled without disturbing the operation.

An advantage of the embodiments which have been described is that it is now possible to select a phase in a polyphase network, to power a load while taking part in the balancing of the phases of the network.

Another advantage of the embodiments which have been described is that they are compatible with an automobile vehicle charging station power management system.

Another advantage, more particularly present in the embodiments of FIGS. 4 and 5, is that no modification of existing charging systems is necessary. It is sufficient to interpose a selector 5 between socket 4 and polyphase electric power supply system 3. In particular, although each socket 4 should preferably be equipped with a phase selector, it is already advantageous to only equip part of them.

Another advantage of the embodiments which have been described is that they optimize the power sampling from the electric power supply network.

It should be noted that unlike energized phase switching systems which should preserve an uninterrupted electric power supply, the described embodiments are intended to switch the phases before powering the load.

Various embodiments have been described. Various alterations and modifications will occur to those skilled in the art. In particular, although the invention has been more specifically described in relation with three-phase network, it more generally applies to any polyphase network. Further, although the invention has been more specifically described in relation with an automobile vehicle charging installation, it more generally applies to a phase selector intended for any charge which may accept a slight delay (typically of a few milliseconds) for its putting into service, for the time necessary to identify the least loaded phase. Further, an installation may be equipped with one or a plurality of systems. Finally, although the above-described embodiments have been described in relation with a preferred example where one selector 5 per socket is provided, it remains possible to connect a plurality of sockets 4 in parallel to the output terminal block of a same selector. The practical implementation of the described embodiments is within the abilities of those skilled in the art based on the functional indications given hereabove by using circuits and tools usual per se.

What is claimed is:

1. A method of balancing a polyphase network for powering an installation comprising a plurality of sockets of connection of electric equipment, wherein:
   for each socket, a phase selector is interposed, between a polyphase voltage supply system and said socket, wherein the polyphase voltage supply system supplies a plurality of phases; and
   once an energizing control signal for energizing a first single-phase equipment of a plurality of single-phase equipments has been received, a least loaded phase is selected to power the first single-phase equipment, wherein an evaluation of the least loaded phase is based on a measurement of the voltages or of the currents of the plurality of phases, said measurement of the voltages or of the currents being triggered by said energizing control signal supplied by said polyphase voltage supply system and received by said phase selector.

2. The method of claim 1, wherein the phase selector transmits the energizing control signal to the socket subsequently to the least loaded phase being selected.

3. The method of claim 1, wherein a selecting control signal for selecting the least loaded phase is sent by said polyphase voltage supply system to said phase selector.

4. The method of claim 1, wherein the evaluation of the least loaded phase is performed by measuring the current sampled from the plurality of phases upstream of the phase selector.

5. A phase selector comprising:
   a control signal input terminal configured to receive an energizing control signal from a polyphase voltage supply system;
   a plurality of phase input terminals, each phase input terminal of the plurality of phase input terminals configured to receive a respective phase of a plurality of phases supplied by the polyphase voltage supply system; and
   a plurality of phase output terminals, each phase output terminal of the plurality of phase output terminals configured to transmit the respective phase of the plurality of phases received from the polyphase voltage supply system to an electric equipment power supply socket; and
   a control circuit configured to, once an energizing control signal for energizing a single-phase equipment has been received via the control signal input terminal, select a least loaded phase of the plurality of phases to power the single-phase equipment, wherein an evaluation of the least loaded phase of the plurality of phases is based on a measurement of the voltages or of the currents of the plurality of phases, said measurement of the voltages or of the currents being triggered by the energizing control signal.

6. The phase selector of claim 5, further comprising:
   a set of switches for connecting said plurality of phase input terminals to said plurality of phase output terminals, wherein the control circuit is configured to control the set of switches.

7. The selector of claim 6, wherein said control circuit interrupts a control connection between the polyphase voltage supply system and a contactor, itself connected to the electric equipment power supply socket.

8. A polyphase power supply installation comprising:
   the polyphase voltage supply system for supplying the plurality of phases;

a plurality of electric equipment power supply sockets; and a plurality of phase selectors between said polyphase voltage supply system and each of the plurality of electric equipment power supply sockets, wherein each phase selector of the plurality of phase selectors is the phase selector of claim 5.

9. The installation of claim 8, wherein an energizing contactor is interposed between each phase selector of the plurality of phase selectors and the respective electric equipment power supply socket of the plurality of electric equipment power supply sockets.

* * * * *

UNITED STATES PATENT AND TRADEMARK OFFICE
CERTIFICATE OF CORRECTION

PATENT NO. : 10,038,320 B2
APPLICATION NO. : 14/894130
DATED : July 31, 2018
INVENTOR(S) : Sylvain Guillemin et al.

Page 1 of 1

It is certified that error appears in the above-identified patent and that said Letters Patent is hereby corrected as shown below:

On the Title Page

At item (72) Inventors: Sylvain Guillemin, Allvard les Baines (FR); Rémi Vial, Chambery (FR), should read:
(72) Sylvain Guillemin, Allvard les Bains (FR); Rémi Vial, Chambery (FR)

Signed and Sealed this
Sixteenth Day of October, 2018

Andrei Iancu
*Director of the United States Patent and Trademark Office*